(12) United States Patent
Ouchi

(10) Patent No.: US 11,516,738 B2
(45) Date of Patent: Nov. 29, 2022

(54) COMMUNICATION APPARATUS, CONTROL METHOD OF COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/800,212

(22) Filed: Feb. 25, 2020

(65) Prior Publication Data

US 2020/0288398 A1    Sep. 10, 2020

(30) Foreign Application Priority Data

Mar. 8, 2019    (JP) .............................. JP2019-043048

(51) Int. Cl.
*H04W 52/02*    (2009.01)
*H04W 40/24*    (2009.01)
*H04W 8/00*    (2009.01)
*H04W 76/11*    (2018.01)

(52) U.S. Cl.
CPC ....... *H04W 52/0229* (2013.01); *H04W 8/005* (2013.01); *H04W 40/244* (2013.01); *H04W 52/0225* (2013.01); *H04W 52/0235* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2018/0242249 A1 | 8/2018 | Yang | |
| 2019/0174413 A1* | 6/2019 | Huang | H04W 48/12 |
| 2019/0223101 A1* | 7/2019 | Li | H04W 76/11 |
| 2020/0178171 A1* | 6/2020 | Lou | H04W 52/0225 |
| 2020/0404589 A1* | 12/2020 | Wang | H04W 52/0235 |

FOREIGN PATENT DOCUMENTS

| | | |
|---|---|---|
| KR | 1020180022612 A | 3/2018 |
| WO | 2018204908 A1 | 11/2018 |

* cited by examiner

*Primary Examiner* — Jutai Kao
(74) *Attorney, Agent, or Firm* — Rossi, Kimms & McDowell LLP

(57) ABSTRACT

A communication apparatus receives a radio frame complying with an IEEE802.11 series standard, acquires information of a WUR (Wake-up Radio) Discovery element included in the received frame, and decides, based on the information of the WUR Discovery element, a WUR channel used to wait for a WUR Discovery frame.

12 Claims, 12 Drawing Sheets

FIG. 3

|  | WUR Capabilities | WUR Operation | WUR Discovery |
|---|---|---|---|
| Beacon | ○ | ○ | ○ |
| Association Request | ○ | | |
| Association Response | ○ | ○ | |
| Reassociation Request | ○ | | |
| Reassociation Response | ○ | ○ | |
| Probe Request | ○ | | |
| Probe Response | ○ | ○ | ○ |

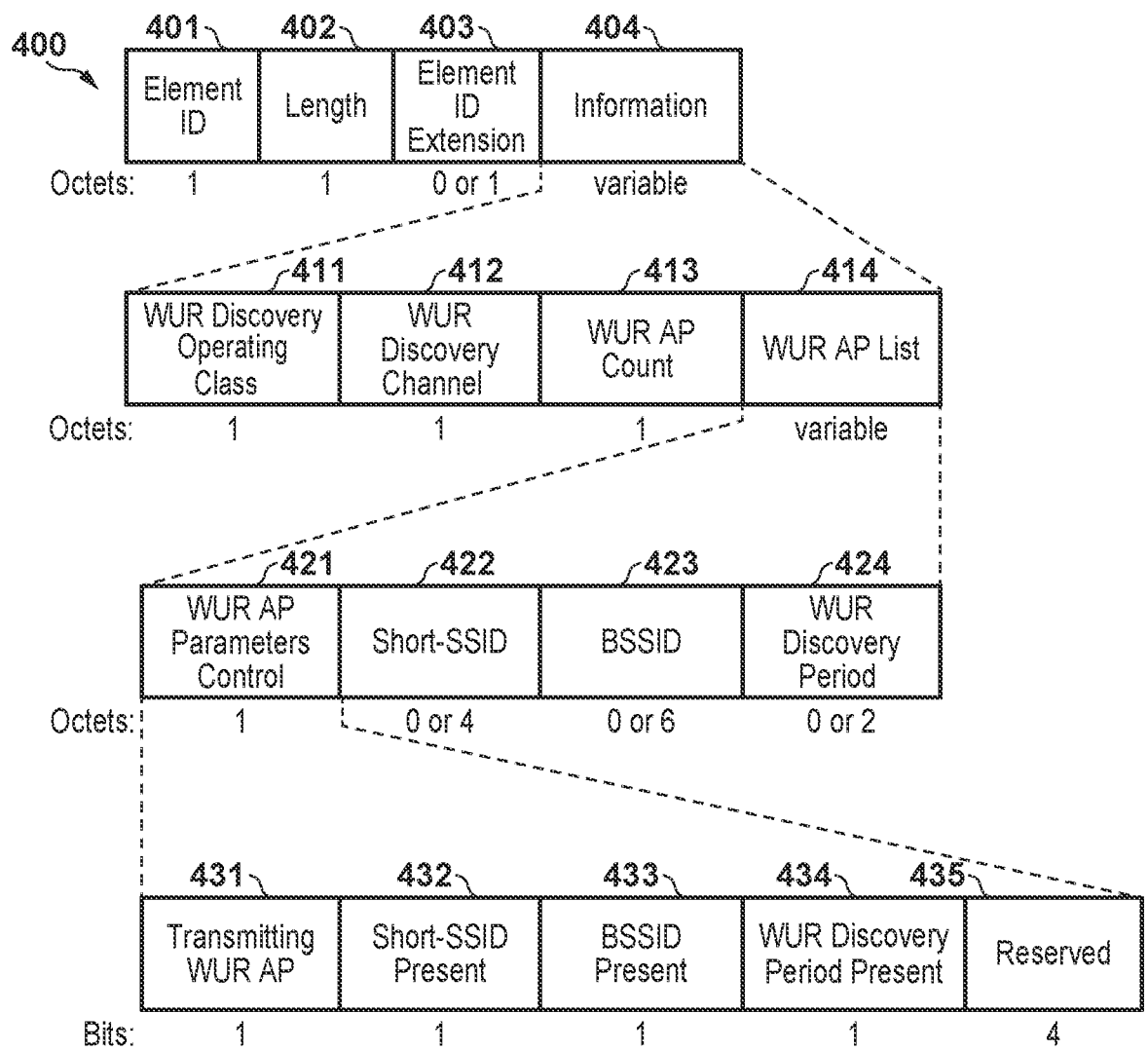

F I G. 5B

511

| Type | Type description |
|---|---|
| 0 | WUR Beacon |
| 1 | WUR Wake-up |
| 2 | WUR Vendor Specific |
| 3 | WUR Discovery |
| 4-7 | Reserved |

531

| Operating Class | Global operating class | Channel starting frequency(GHz) | Channel spacing(MHz) | Channel set | Channel center frequency index | Behavior limits set |
|---|---|---|---|---|---|---|
| 1 | 115 | 5 | 20 | 34,38,42,46 36,50,44,48 | — | — |
| ... | | | | | | |
| 41 | 81 | 2.507 | 25 | 1,2,3,4,5,6,7,8, 9,10,11,12,13 | — | LicenseExemp tBehavior |
| 141-255 | Reserved | Reserved | Reserved | Reserved | Reserved | Reserved |

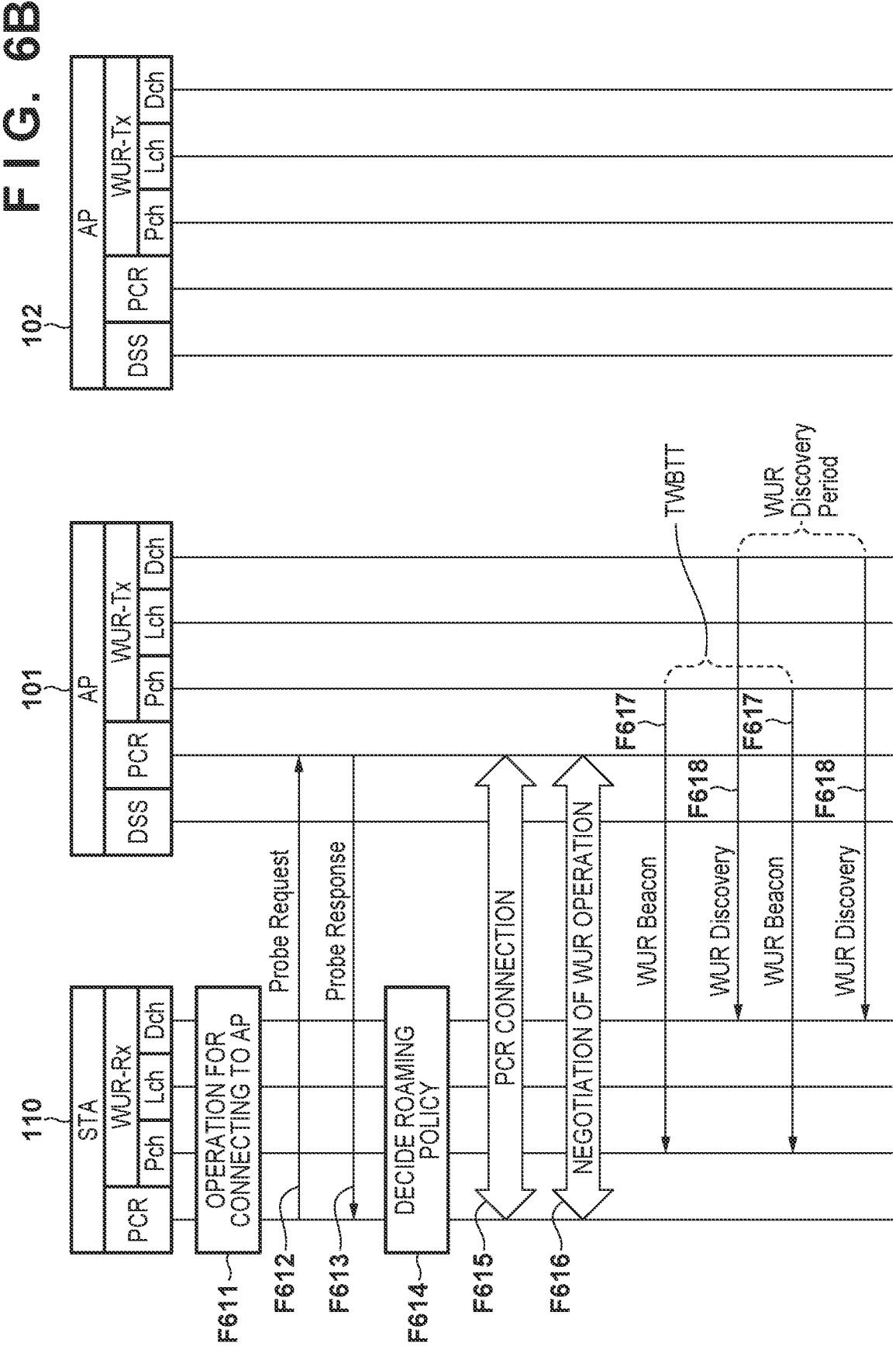

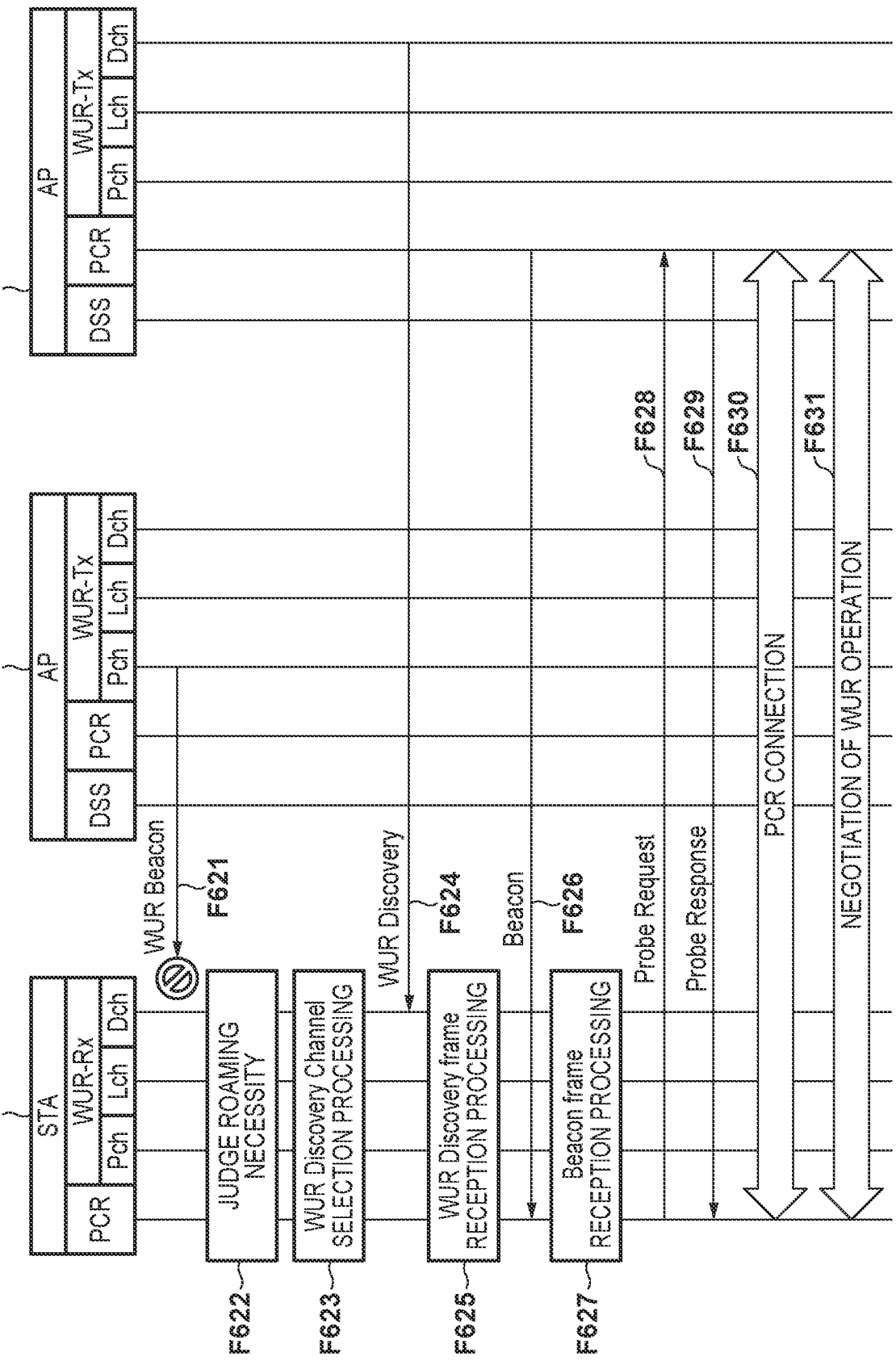

FIG. 7

| index 701 | Transmitting WUR AP 702 | WUR Discovery Channel 703 | WUR ID 704 | short-SSID 705 | BSSID 706 | WUR Discovery Period 707 | Compressed SSID 708 | Operating Class 709 | Ch 710 | SCAN TARGET ORDER 711 | WUR RSSI 712 | PCR RSSI 713 | VALID/ INVALID 714 |
|---|---|---|---|---|---|---|---|---|---|---|---|---|---|
| 0 | 0 | 1 | ID00 | 00 00 00 00 | ff ff ff ff ff ff | 00 00 | aa ac | 41 | 6 | 8 | | | |
| 1 | 0 | 1 | ID01 | aa aa aa aa | ff ff ff ff ff ff | 00 03 | aa ax | 41 | 11 | 8 | | | |
| 2 | 0 | 40 | ID02 | aa aa aa aa | ff ff ff ff ff ff | 00 04 | aa ay | 1 | 40 | 7 | | | |
| 3 | 0 | 40 | ID03 | 00 00 00 00 | ff ff ff ff ff ff | 00 04 | aa aa | 1 | 40 | 7 | | | |
| 4 | 0 | 44 | ID04 | 00 00 00 00 | ff ff ff ff ff ff | 00 00 | aa ac | 1 | 44 | 6 | | | |
| 5 | 0 | 44 | ID05 | aa aa aa aa | ff ff ff ff ff ff | 00 00 | aa aa | 1 | 44 | 3 | | | |
| 6 | 0 | 44 | ID06 | 00 00 00 00 | ff ff ff ff ff ff | 00 60 | 00 00 | 1 | 40 | 6 | | | |
| 7 | 1 | 149 | ID07 | aa aa aa aa | 00 00 85 11 11 11 | 00 00 | aa aa | 1 | 48 | 0 | | | |
| 8 | 0 | 153 | ID08 | 00 00 00 00 | ff ff ff ff ff ff | 00 08 | aa aa | 1 | 36 | 5 | | | |
| 9 | 0 | 153 | ID09 | 00 00 00 00 | 00 00 85 00 00 01 | 00 06 | aa aa | 1 | 48 | 4 | | | |
| 10 | 0 | 153 | ID10 | aa aa aa aa | 00 00 85 00 00 02 | 00 04 | aa aa | 1 | 36 | 2 | | | |
| 11 | 0 | 153 | ID11 | aa aa aa aa | 00 00 85 00 00 03 | 00 02 | aa aa | 1 | 48 | 1 | | | |

COMMUNICATION APPARATUS, CONTROL METHOD OF COMMUNICATION APPARATUS, AND NON-TRANSITORY COMPUTER-READABLE STORAGE MEDIUM

BACKGROUND OF THE INVENTION

Field of the Invention

The present invention generally relates to a communication control technique in a wireless LAN, particularly to a communication apparatus, a control method of a communication apparatus, and a non-transitory computer readable storage medium.

Description of the Related Art

In recent years, the IEEE802.11ba standard has been examined in the IEEE (Institute of Electrical and Electronics Engineers). The IEEE802.11ba standard defines that to improve power saving performance, a communication apparatus is provided with a WUR (Wake-up Radio) unit separately from a PCR (Primary Connectivity Radio) unit that is a conventional RF (Radio Frequency) unit. If the PCR unit is in a power saving state, the PCR unit is shifted to a normal state in accordance with reception of a radio frame (wake-up frame) by the WUR unit, whereby the communication apparatus implements a power saving function (US-2018-0242249).

US-2018-0242249 discloses that in a wireless communication system complying with the IEEE802.11ba standard, if an STA (station) cannot be subjected to WUR management by a first AP (access point) because of a movement or the like, it attempts connection to a second AP as a roaming destination AP. However, patent literature 1 does not explicitly show a procedure of deciding a PCR channel used by the STA to perform communication by PCR with the second AP. For this reason, when searching for and deciding the PCR channel used by the STA to perform communication by PCR with the second AP, power consumption necessary for waiting for information for the search increases, or a time is needed until the connection by PCR.

SUMMARY OF THE INVENTION

In consideration of the above problem, this disclosure provides a technique for efficiently deciding a channel used to wait for a WUR Discovery frame.

According to one aspect of the present invention, there is provided a communication apparatus which comprises: a reception unit configured to receive a radio frame complying with an IEEE802.11 series standard; an acquisition unit configured to acquire information of a WUR (Wake-up Radio) Discovery element included in the frame received by the reception unit; and a decision unit configured to decide, based on the information of the WUR Discovery element, a WUR channel used to wait for a WUR Discovery frame.

According to another aspect of the present invention, there is provided a control method of a communication apparatus, wherein the method comprises: receiving a radio frame complying with an IEEE802.11 series standard; acquiring information of a WUR (Wake-up Radio) Discovery element included in the frame received in the receiving; and deciding, based on the information of the WUR Discovery element, a WUR channel used to wait for a WUR Discovery frame.

According to another aspect of the present invention, there is provided a non-transitory computer-readable storage medium storing a computer program for causing a computer to execute a control method of a communication apparatus, wherein the method comprises: receiving a radio frame complying with an IEEE802.11 series standard; acquiring information of a WUR (Wake-up Radio) Discovery element included in the frame received in the receiving; and deciding, based on the information of the WUR Discovery element, a WUR channel used to wait for a WUR Discovery frame.

Further features of the present invention will become apparent from the following description of exemplary embodiments (with reference to the attached drawings).

BRIEF DESCRIPTION OF THE DRAWINGS

FIG. 3 shows information elements that can be included in Management frames;

FIG. 4A shows an example of the frame configuration of a WUR Discovery element;

FIG. 4B shows the correspondence between an Element ID and an Element ID Extension;

FIG. 5B shows values represented by Type 511 in Frame Control 501 in the upper portion and details of Operating Class in the lower portion;

FIG. 6B shows the procedure of processing executed by the STA 110, the AP 101, and the AP 102 (part 2);

FIG. 6C shows the procedure of processing executed by the STA 110, the AP 101, and the AP 102 (part 3);

FIG. 7 shows a roaming management table;

DESCRIPTION OF THE EMBODIMENTS

Figure 1:
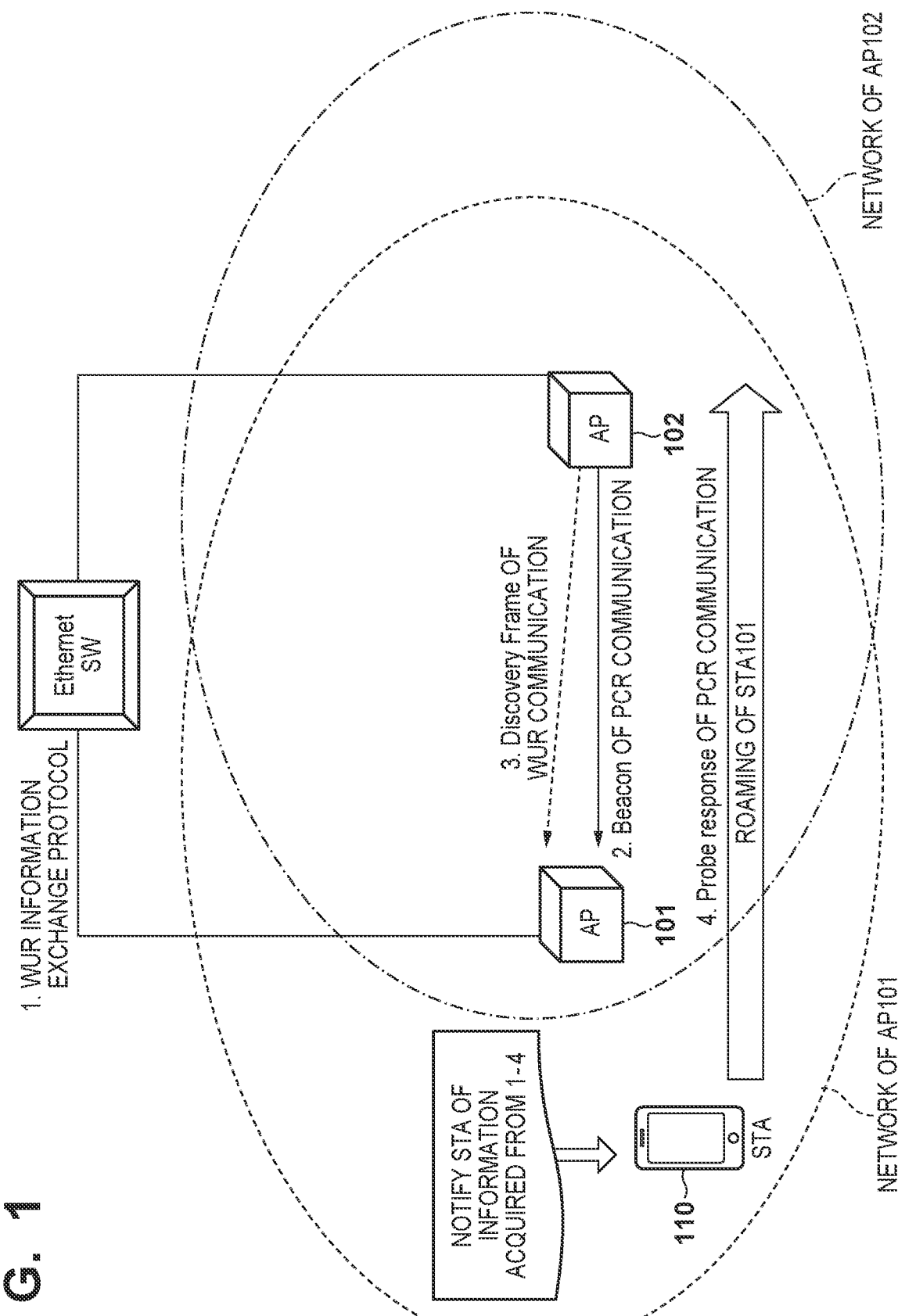
FIG. 1 shows the schematic arrangement of a network.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Network Arrangement)

FIG. 1 shows a communication network arrangement according to this embodiment. This network is formed by an AP (access point) 101, an AP 102, and an STA (station/terminal) 110. These are communication apparatuses that support IEEE802.11ba. The AP 101 and the AP 102 have the same ESSID (Extended Service Set Identifier). Note that an SSID is the identifier of the network of a wireless LAN in a standard of the IEEE802.11 series, and an ESSID is an SSID extended so that it can be used by a plurality of APs.

Note that the arrangement shown in FIG. 1 is merely an example. Similar access points may exist in addition to the communication apparatuses shown in FIG. 1, and a communication apparatus that communicates with the STA 110 via the AP 101 or the AP 102 may exist.

(Arrangement of Communication Apparatus)

Figure 2A:
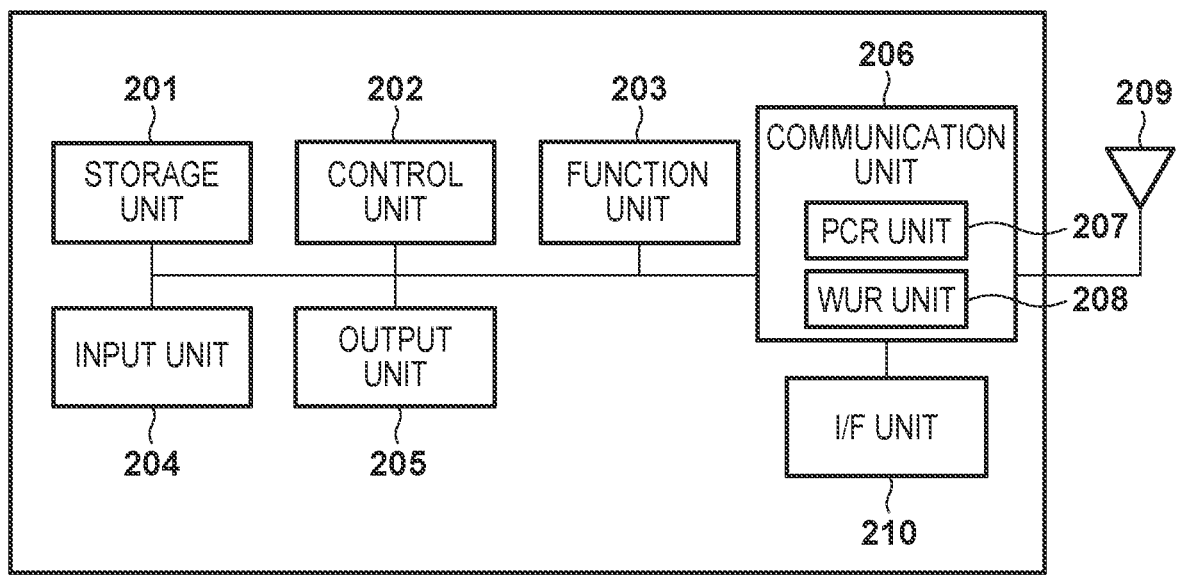
FIG. 2A shows an example of the hardware arrangement of an STA/AP.

FIG. 2A shows an example of the hardware arrangement of the STA 110. The STA 110 includes, as its hardware arrangement, for example, a storage unit 201, a control unit 202, a function unit 203, an input unit 204, an output unit 205, a communication unit 206, an antenna 209, and an interface (I/F) unit 210.

The storage unit 201 is formed by a memory such as a ROM or a RAM, and stores programs configured to perform various kinds of operations to be described later and various kinds of information such as communication parameters for wireless communication. Note that as the storage unit 201, a storage medium such as a flexible disk, a hard disk, an optical disk, a magnetooptical disk, a CD-ROM, a CD-R, a magnetic tape, a nonvolatile memory card, or a DVD may be used in addition to the memory such as a ROM or a RAM. In addition, the storage unit 201 may include a plurality of memories.

The control unit 202 is formed by at least one processor such as a CPU or an MPU, and executes a program stored in the storage unit 201, thereby controlling the STA 110. Note that the control unit 202 may control the STA 110 in cooperation with the program stored in the storage unit 201 and an OS (Operating System). In addition, the control unit 202 may be formed by a plurality of processors such as a multicore and control the STA 110. The control unit 202 can execute predetermined processing such as image capturing, printing, or projection by controlling the function unit 203. The function unit 203 is hardware used by each terminal to execute predetermined processing.

The input unit 204 accepts various kinds of operations from a user. The output unit 205 performs various kinds of outputs for the user. Here, the output by the output unit 205 includes at least one of display on a screen, voice output by a speaker, and vibration output. Note that the input unit 204 and the output unit 205 may be implemented by one module, like a touch panel.

The communication unit 206 controls wireless communication complying with the IEEE802.11 series or Wi-Fi, or controls IP (Internet Protocol) communication. In addition, the communication unit 206 controls a PCR (Primary Connectivity Radio) unit 207 that is a conventional RF (Radio Frequency) unit (circuit), and a WUR (Wake-up Radio) unit 208. Generally, in the STA, only reception processing is performed by the WUR unit 208. Hence, the communication unit 206 can operate only the reception function of the WUR unit 208. Furthermore, the communication unit 206 controls the antenna 209 to transmit/receive a wireless signal for wireless communication. The I/F unit 210 is an interface to Ethernet® or a public network, and may not exist when the STA 110 performs tethering.

The AP 101 and the AP 102 have the same hardware arrangement as in FIG. 2A, and includes, as an example, the storage unit 201, the control unit 202, the function unit 203, the input unit 204, the output unit 205, the communication unit 206 including the PCR unit 207 and the WUR unit 208, the antenna 209, and the I/F unit 210. Concerning the communication unit 206, since the AP performs only transmission processing by the WUR unit, the communication unit 206 can operate only the transmission function of the WUR unit 208.

Figure 2B:
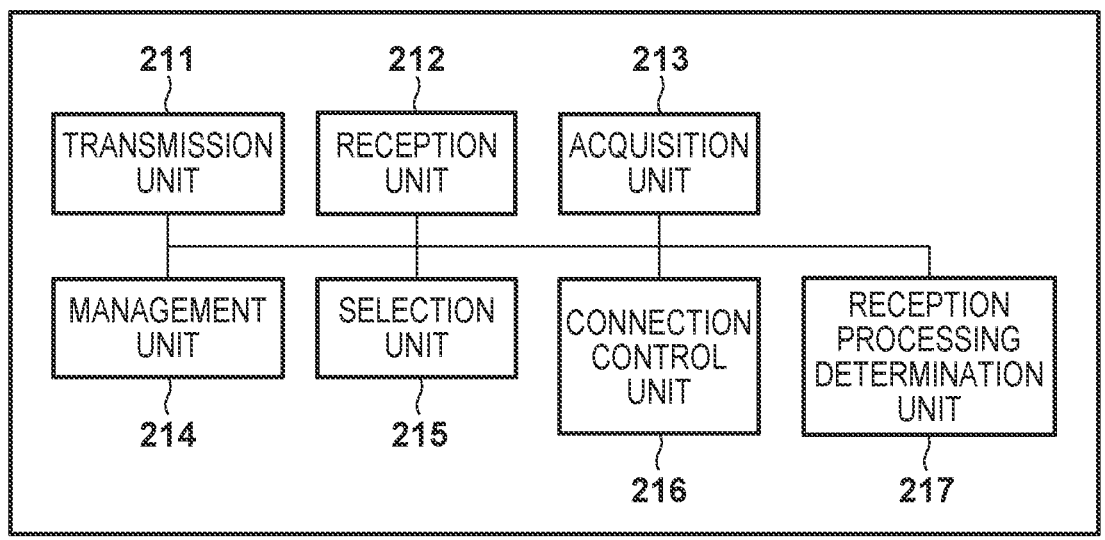
FIG. 2B shows an example of the functional arrangement of the STA.

FIG. 2B shows the functional arrangement of the STA 110. The STA 110 includes, as its functional arrangement, for example, a transmission unit 211, a reception unit 212, an acquisition unit 213, a management unit 214, a selection unit 215, a connection control unit 216, and a reception processing determination unit 217. The transmission unit 211 and the reception unit 212 perform transmission and reception of a signal, respectively, via the communication unit 206 (FIG. 2A). The acquisition unit 213 acquires all pieces of information from the signal (frame) received by the reception unit 212. For example, the acquisition unit 213 acquires a WUR Discovery element that is information included in a frame such as a Beacon received by the reception unit 212, and based on the information, acquires the information of one or more channels to receive a WUR Discovery frame from one or more APs. Based on the information included in the WUR Discovery element or the WUR Discovery frame received by the reception unit 212, the management unit 214 creates/updates a roaming management table (information concerning one or more candidate channels for a roaming destination) shown in FIG. 7 to be described later, and manages it in the storage unit 201. The selection unit 215 decides a roaming policy when the STA 110 changes the AP to connect. The roaming policy is, for example, the time until the roaming destination is decided or a selection criterion used when a plurality of roaming destination candidates exist. Furthermore, the selection unit 215 decides the roaming destination (the information of an AP and a channel) by referring to the roaming management table managed by the management unit 214 based on the selection criterion. The connection control unit 216 controls the communication unit 206, thereby performing PCR control or control concerning WUR connection (PCR connection or negotiation of WUR operation). The reception processing determination unit 217 performs judgment (whether the communication unit 206, the WUR unit 208 and the antenna 209 correspond to a predetermined frequency band or whether a received signal includes predetermined information to complete reception processing) concerning reception processing.

(Configuration of Frame Transmitted/Received by PCR Unit)

FIG. 3 shows information elements that can be included in Management Frame complying with the standard of the IEEE802.11 series. Management Frames are frames such as Beacon, (Re)Association Request/Response, and Probe Request/Response. The APs and the STA can obtain information necessary for the IEEE802.11ba operation by transmitting/receiving these frames.

A WUR Capabilities element is an information element representing the capability of the communication unit 206 to the WUR function of the STA. This information element includes the transition time of the PCR unit 207 from the power saving state/OFF state to the normal state for each of, for example, "2.4 GHz" and "4.9 GHz and 5 GHz". A WUR Operation element is an information element used to notify the operation state of WUR from the AP to the STA. This information element includes, for example, a channel (WUR channel) to notify the WUR Beacon or a time interval (WUR Beacon Period) to notify the WUR Beacon. Note that the WUR Beacon will be described later. A WUR Discovery element is an information element including information concerning the channel of a WUR Discovery frame that can be transmitted from one or more APs. The STA that has received a frame including this information element waits (scans) in the channel designated by the information element. If the WUR Discovery frame is received, the STA can grasp the channel of the operating channel of PCR included in the frame. Note that details of the WUR Discovery frame will be described later.

FIG. 4A shows a frame configuration example 400 of the WUR Discovery element in the information elements shown in FIG. 3. An Element ID 401 is a field to identify the information element, and the information element concerning WUR indicates 255 (see FIG. 4B). A Length 402 represents the length of the information element. An Element ID Extension 403 represents a value corresponding to the information element. FIG. 4B shows the correspondence between the Element ID 401 and the Element ID Extension 403. If the information element is the WUR Capabilities element, the Element ID Extension 403 is 48. If the information element is the WUR Operation element, the Element ID Extension 403 is 49. If the information element is the WUR Mode element, the Element ID Extension 403 is 50. If the information element is the WUR Discovery element, the Element ID Extension 403 is 51.

Information 404 represents the contents of the information element, and its length can change in accordance with the contents. The Information 404 is formed from the following four fields. A WUR Discovery Operating Class 411 represents the expression of the class value for the WUR Discovery frame on the IEEE802.11 standard, and has one of the values of Operating Class 531 (FIG. 5A) to be described later. A WUR Discovery Channel 412 represents a channel for the WUR Discovery frame. A WUR AP Count 413 is a number obtained by subtracting 1 from the number of WUR AP Parameters included in a WUR AP List 414 to be described later. That is, when this value is 0, it represents that one WUR AP Parameter exists in the WUR AP List 414.

The WUR AP List 414 includes one or more WUR AP Parameters. A WUR AP Parameter is formed from the following four fields. A WUR AP Parameters Control 421 represents the presence/absence of three subsequent items (a Short-SSID 422 to a WUR Discovery Period 424). The Short-SSID 422 represents 32 bits calculated from the SSID of the AP that is transmitting the information element, and is defined by the IEEE802.11ai standard. The BSSID 423 is the BSSID (Basic Service Set Identifier) of the AP that is transmitting the information element. The WUR Discovery Period 424 represents the time interval (the unit is TU: Time Unit) to transmit the WUR Discovery frame.

In the WUR AP Parameters Control 421, if a Transmitting WUR AP 431 is information concerning the AP that is transmitting the information element, the Transmitting WUR AP 431 is 1. Otherwise, the Transmitting WUR AP 431 is 0. If the Short-SSID 422 includes a Short-SSID of 4 octets (4 bytes or 32 bits), a Short-SSID Present 432 is 1. If the BSSID 423 includes a BSSID of 6 octets, a BSSID Present 433 is 1. If the WUR Discovery Period 424 includes a value of 2 octets, a WUR Discovery Period Present 434 is 1. Reserved 435 is an unused 4-bit reserved area.

(Configuration of WUR Discovery Frame)

Figure 5A:
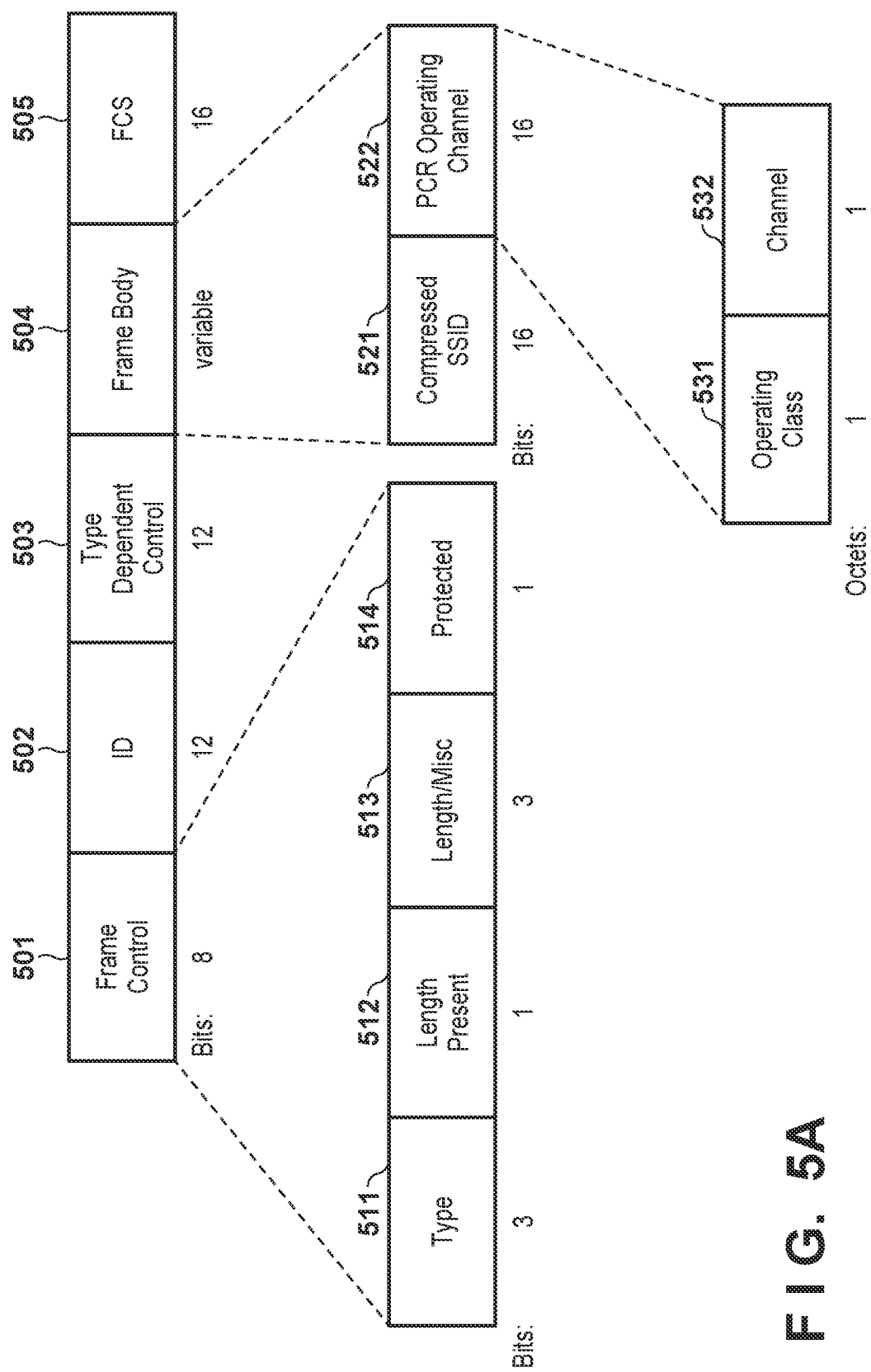
FIG. 5A shows an example of the frame configuration of a WUR Discovery frame.

FIG. 5A shows a frame configuration example 500 of the WUR Discovery frame. The WUR Discovery frame is a frame used to notify the operating channel of PCR. By this frame, the STA can grasp the operating channels of a plurality of APs and wait for Beacon or transmit a Probe Request, thereby discovering an AP.

Frame Control 501 to FCS 505 are configurations common to frames defined by IEEE802.11ba. The Frame Control 501 is a field also called a MAC header, and details thereof will be described later. The value of the ID 502 is determined by Type 511 in the Frame Control 501. For example, in the WUR Discovery frame, the ID 502 is the ID of the transmitter that has transmitted the frame. A description of the Type Dependent Control 503 and the FCS (Frame Check Sequence) 505 will be omitted. The Frame Body 504 is a field of a variable length, and details thereof will be described later.

Details of the value represented by the Type 511 in the Frame Control 501 are shown in the upper portion of FIG. 5B. In the WUR Discovery frame, the Type 511 is 3. Length Present 512 represents whether following Length/Misc 513 represents the Length. When the Length Present 512 is 1, the Length/Misc 513 represents the Length. Note that when the Length Present 512 is 0, the Length/Misc 513 represents Misc, and a detailed description thereof will be omitted. Protected 514 represents whether the WUR Discovery frame is protected by an MIC (Message Integrity Check) algorithm. If the Protected 514 is 1, the WUR Discovery frame is protected by the MIC. If the Protected 514 is 0, it represents that the Discovery includes a CRC (Cyclic Redundancy Check).

In the Frame Body 504, a Compressed SSID 521 represents the 16-bit value of the LSB of the Short-SSID of the AP that has transmitted the frame. A PCR Operating Channel 522 includes the Operating Class 531 and a Channel (number) 532. The Operating Class 531 corresponds to a plurality of items concerning the operation commonly defined by the IEEE802.11 standard, and details of the items are shown in the lower portion of FIG. 5B.

(Procedure of Processing)

A processing sequence when the STA 110 performs roaming from the AP 101 to the AP 102 will be described next with reference to FIGS. 6A to 6C. The processing operations shown in FIGS. 6A to 6C can be implemented when the control unit 202 of each of the STA 110, the AP 101, and the AP 102 executes a control program stored in the storage unit 201 and executes calculation and processing of information and control of each piece of hardware.

Abbreviations used in the explanation of FIGS. 6A to 6C will be described first. DSS of an AP is short for Distribution System Service, which is the interface of a DS (Distribution Service) different from the DS of the AP. In this embodiment, the DSS can be implemented by the I/F unit 210. WUR-Tx is the transmission function for the three kinds of frames (Beacon, Wake-up, and Discovery) by WUR in the AP 101 and the AP 102. In this embodiment, WUR-Tx can be implemented by the communication unit 206 and the WUR unit 208.

Pch, Lch, and Dch are channels (WUR channels) used by the WUR function. Pch is short for WUR primary channel, and is a channel used to notify the WUR Beacon. The channel used to notify the WUR Beacon is also called a WUR Channel. The WUR Channel can be represented by the WUR Operation Parameter in the WUR Operation element. Lch is short for WUR Listen channel, and is a channel used to wait for (listen) a WUR Wake-up frame when the STA is in a WUR awake state (WUR Mode state). Dch is short for WUR Discovery channel, and is a channel used by the AP to transmit the WUR Discovery frame. The STA can know the operating channel of PCR of the AP by receiving the frame. Note that in the IEEE802.11ba standard, Dch is 1ch in the 2.4-GHz band, or is one of 40ch, 44ch, 149ch, and 153ch in the 5-GHz band. To which channel Pch, Lch, and Dch should be assigned depends on the operation settings of the AP. Hence, all of Pch, Lch, and Dch may be assigned to the same channel, arbitrary two of them may be assigned to the same channel, or all of them may be assigned to different channels.

WUR-Rx is the WUR reception function of the STA 110 and the AP 101. In this embodiment, WUR-Rx can be implemented by the communication unit 206 and the WUR unit 208. In addition, the STA 110 manages the roaming management table to be described later with reference to FIG. 7.

Figure 6A:
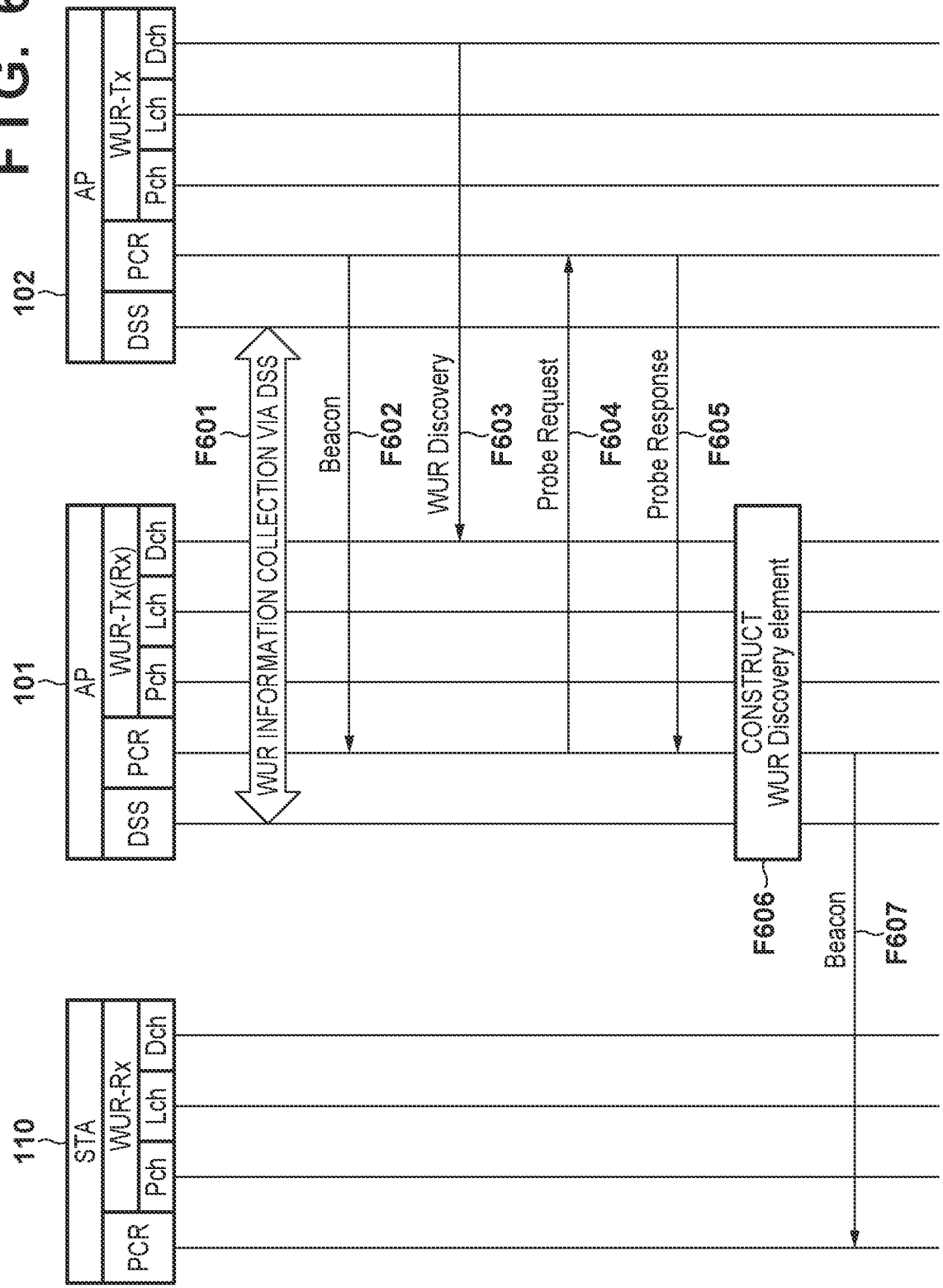
FIG. 6A shows the procedure of processing executed by the STA 110, the AP 101, and the AP 102 (part 1)

<FIG. 6A: AP 101 Collects WUR Information and Makes Notification by Beacon>

First, the AP 101 collects WUR information from the AP 102 that is an AP in the neighborhood by at least one of methods F601 to F604 (see (1) to (4) in FIG. 1).

F601 is the first method for WUR information collection, and is a method intermediated by the DSS. This can be used when the AP 101 and the AP 102 are communication apparatuses corresponding to a predetermined exchange procedure of a WUR information exchange protocol. The exchange procedure is, for example, an exchange procedure using the Vendor Extension of a Multi-AP of Wi-Fi® that is an organization for guaranteeing interconnectivity of wireless LAN communication. The Multi-AP is a framework for controlling a plurality of APs, and a Controller and an Agent are defined. The Controller is a logic mechanism that controls a network formed from a plurality of APs. In addition, the Agent is a logic mechanism that executes the control function of an AP and provides information for control to the Controller. Hence, the Controller and the Agent can be implemented as programs in the storage unit 201. In one Multi-AP configuration, the Controller function operates in one AP, and the Agent function operates in all APs. Furthermore, in addition to information commonly defined by Wi-Fi, unique information can be exchanged between the Controller and the Agent. This uses an extension regulation called Vendor Extension. Hence, when the AP 101 and the AP 102 form the Multi-AP, information concerning the PCR and WUR of each AP can be notified to each other by the Controller function. Here, the information concerning PCR includes the Compressed SSID 521, the PCR Operating Channel 522, and the like. In addition, the information concerning WUR includes the WUR Discovery Channel 412, the Short-SSID 422, the BSSID 423, the WUR Discovery Period 424, and the like.

In this way, the AP 101 acquires the information of an AP that supports WUR in the neighborhood, and constructs the Information 404 of the WUR Discovery element. However, if the WUR information exchange procedure is not established between the plurality of APs, or if the Vendor (manufacturer or sales company) is different, the method of F601 cannot be used. In this case, the second to fourth methods are used, as will be described below.

F602 is the second method of WUR information collection, and is a method of receiving the Beacon. In this method, the AP 101 collects, as WUR information, the Information 404 of the WUR Discovery element in the Beacon of the AP 102. Note that if possible, the WUR information is collected by receiving the Beacon by a channel other than the operating channel of PCR of the AP 101. This processing can be performed periodically or any time when the AP 101 does not perform the transmission processing.

F603 is the third method of WUR information collection, and is a method in which the AP 101 receives the WUR Discovery frame transmitted on Dch of WUR. In this method, the AP 101 executes the WUR-Rx function, and the WUR Discovery frame can be received periodically and comprehensively by the above-described five WUR Discovery Channels.

F604 and F605 indicate the fourth method of WUR information collection. In this method, the AP 101 performs active scan in which the AP 101 transmits a Probe Request to the AP 102, and causes the AP 102 to transmit a Probe Response. Note that the SSID included in the Probe Request may be the SSID of the AP 101 itself, or may be a Wildcard SSID whose value is 0 (zero) or Null. In addition, the channel to transmit the Probe Request may be the same as the operating channel of PCR of the AP 101, or may be different.

After an arbitrary one of the four methods is executed, in F607, the AP 101 constructs the WUR Discovery element (F606). Next, the AP 101 transmits the Beacon including the constructed WUR Discovery element in the transmission period of the PCR Beacon (F607).

<FIG. 6B: STA 110 Performs PCR Connection with AP 101, Negotiation of WUR Operation, and WUR Awake>

In F611, the STA 110 recognizes a connection operation to the AP 101 by the user. In F612, the STA 110 transmits the Probe Request. In F613, the AP 101 transmits the Probe Response including the WUR Discovery element. In F614, the STA 110 decides the roaming policy. This is deciding the time until the roaming destination is decided or deciding the selection criterion used when a plurality of roaming destination candidates exist. F615 is connection processing between the STA 110 and the AP 101. This connection processing includes transmission/reception of a Request and a Response for each of Authentication and Association. F616 is the negotiation procedure of the WUR operation. This is a procedure of transmitting a WUR Mode Setup Request from the STA 110 and sending a response from the AP 101 by a WUR Mode Setup Response. Basically, when the STA 110 transmits the WUR Mode Setup Request, and the AP 101 directly accepts the Request, the WUR Mode Setup Response including the meaning of Accept is returned. To change the requested value, the AP 101 can designate it by the WUR Mode Setup Response. The AP 101 can also transmit the WUR Mode Setup Response in a state in which the WUR Mode Setup Request is not received. In this way, for example, a Duty Cycle Period, On Duration, and Starting time to decide the schedule of the STA 110 to enable the WUR reception function (set WUR-Rx to "ON") are decided. Here, the On Duration is the time in which WUR-Rx is "ON" during the Duty Cycle Period. That is, there is also a period in which WUR-Rx is "OFF", and further power saving is implemented. Note that the negotiation can also be made so the period in which WUR-Rx is "OFF" does not exist. In addition, as another negotiation item, there is an offset value from the WUR Primary Channel of the channel to transmit the WUR Wake-up frame.

After such a negotiation, the STA 110 performs processing for transitioning to a WUR Mode state. The WUR Mode is a state in which the WUR service from the AP is received. The WUR service indicates providing of the WUR Beacon, the WUR Discovery frame, and the Wake-up frame. Note that depending on the WUR service, the timing of receiving the WUR Wake-up frame by the STA 110 can be limited to the timing at which the PCR unit 207 is in a doze state. To transition to the WUR Mode state, the STA 110 transmits a frame whose Action Type is Enter WUR Mode Request. Upon receiving, from the AP 101, a frame whose Action Type is WUR Mode Response, and whose Status field has a value of Accept (0: zero), the STA 110 transitions to the WUR Mode state, and the AP 101 handles the STA 110 in the WUR Mode state. Additionally, even in a case in which the STA 110 transmits a frame whose Action Type is Enter WUR Mode, and the AP 101 returns ack of IEEE802.11, the STA 110 transitions to the WUR Mode state.

When transitioning to the WUR Mode state, the STA 110 starts the power saving function of PCR. Power saving means that the communication unit 206 sets the PCR unit 207 in a sleep or doze state and refrains from performing transmission/reception. In the power saving state of PCR, the STA 110 enables WUR-Rx (ON) (the communication unit 206 activates the WUR unit 208) to make it possible to receive the Wake-up frame from the AP. At this time, the power consumed to enable WUR-Rx is smaller than the power consumed to enable reception by PCR. Hence, power saving can be implemented in the whole STA.

In F617, the AP 101 transmits a WUR Beacon on Pch. Note that in the IEEE802.11ba standard, as long as an STA that needs the WUR service exists, the AP transmits the WUR Beacon at an interval called TWBTT (Target WUR Beacon Transmission Time). In addition, the STA 110 basically receives the Beacon.

In F618, the AP 101 transmits the WUR Discovery frame. The transmission interval of the frame is the WUR Discovery Period 424. In FIG. 6B, the STA 110 always receives the WUR Discovery frame. However, if the STA 110 does not need the frame, the frame need not be received.

Note that although not illustrated in FIG. 6B, the STA 110 that has transitioned to the WUR Mode state waits for the WUR Wake-up frame on Lch in accordance with the WUR Duty Cycle and the On Duration. Here, based on the information (value) included in the WUR Operation element transmitted from the AP 101, the STA 110 grasps which channel should be used to wait.

<FIG. 6C: Determination of Roaming Necessity of STA, Decision of Scan Channel, and Roaming to AP 102>

F621 represents that an event in which the STA 110 cannot normally receive the WUR Beacon has occurred. The cause of occurrence of this event is a fault in the AP 101, movement of the STA 110 or the AP 101, a change in the propagation characteristic between the AP 101 and the STA 110 caused by a change in the ambient situation, or the like. Note that the STA 110 may include, as hardware and/or a functional component, a detection means for detecting whether roaming is necessary. In F622, the STA 110 determines the necessity of roaming. In the sequence shown in FIG. 6C, the STA 110 determines that "roaming is necessary". Hence, the STA 110 operates to search for (scan) not the AP 101 but another AP.

In F623, the STA 110 performs WUR Discovery Channel selection processing. Details of this processing will be described later with reference to FIG. 8. In F624, the STA 110 receives the WUR Discovery frame on the WUR Discovery Channel (Dch) selected in F623. F625 is WUR Discovery frame reception processing by the STA 110. The STA 110 decides, based on the information acquired in F624, whether to shift to a state to wait for the Beacon of PCR. Details of this processing will be described later with reference to FIG. 9. In F626, the STA 110 receives the Beacon. In F627, the STA 110 performs reception processing of the received Beacon. The subsequent processes of F628, F629, F630, and F631 are the same as the processes of F612, F613, F615, and F616, respectively, and a description thereof will be omitted. Note that after F630, the STA 110 may perform the roaming policy decision in F614 anew.

The roaming management table referred to in the process of F623 will be described here. FIG. 7 shows an example of the roaming management table. The items of the roaming management table are set based on information included in the WUR Discovery element, the WUR Discovery frame, or a frame from the AP of a roaming destination candidate. An index 701 takes a value from 0 (zero) to the WUR AP Count 413. A Transmitting WUR AP 702 is the value of the Transmitting WUR AP 431 shown in FIG. 4A. A WUR Discovery Channel 703 is the value of the WUR Discovery Channel 412 shown in FIG. 4A. A WUR ID 704 is the WUR ID of the AP that has transmitted the WUR Discovery frame. This is a 12-bit value and is expressed as IDxx for the descriptive convenience. A Short-SSID 705 is the value of the Short-SSID 422. If the Short-SSID 422 does not exist, 0x00, 0x00, 0x00, and 0x00 (4 octets) are set on the management table. A BSSID 706 is the value of the BSSID 423. If the BSSID 423 does not exist, the BSSID 706 is set to 0xff, 0xff, 0xff, 0xff, 0xff, and 0xff (6 octets). A WUR Discovery Period 707 is the value of the WUR Discovery Period 424. A Compressed SSID 708 is the value of the Compressed SSID 521. An Operating Class 709 is the value of the Operating Class 531. A Channel 710 is the value of the Channel 532. As for a scan target order 711, the value is set to wait for the WUR Discovery frame in accordance with the order. As an example of the order, for example, a frame whose "short-SSID matches a desired value" or whose "BSSID is explicitly shown" is scanned first. Note that if the order does not matter, this item is blank. A WUR RSSI 712 is the RSSI (Receive Signal Strength Indicator) of the received WUR Discovery frame. A PCR RSSI 713 is the RSSI of the Beacon (or Probe Response) for the AP. Valid/invalid 714 represents valid/invalid of the WUR Discovery frame. If the WUR Discovery frame is not appropriate as the roaming destination of the STA, "invalid" is set.

Note that the WUR ID 704, the Compressed SSID 708, the Operating Class 709, the Channel 710, and the WUR RSSI 712 can be updated when the WUR Discovery frame is received. In addition, updating of the management table shown in FIG. 7 may be performed when the Beacon is received from another AP after the STA 110 is connected to an AP by PCR. At this time, information whose Transmitting WUR AP 431 is "1" in the Beacon from the other AP is set to "0" in the Transmitting WUR AP 702 on the management table. In addition, the STA 110 need not add, to the management table, information concerning the AP to which the STA 110 itself is connected, which is included in the Beacon from the other AP.

Figure 8:
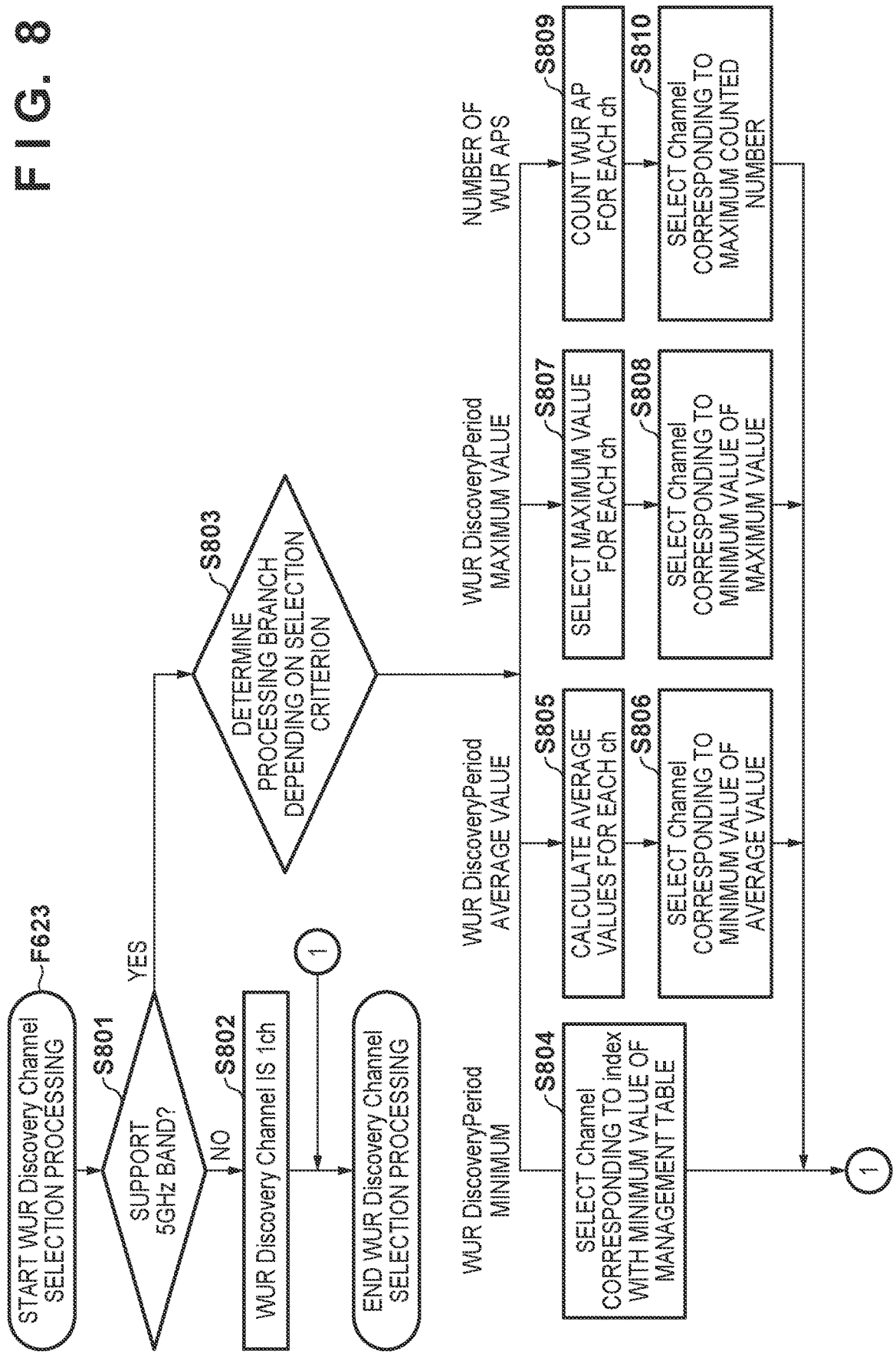
FIG. 8 is a flowchart showing selection processing of a WUR Discovery Channel.

Selection processing (decision processing) of the WUR Discovery Channel in F623 of FIG. 6C will be described next with reference to FIG. 8. FIG. 8 is a flowchart showing selection processing of the WUR Discovery Channel. This selection processing is processing of providing a predetermined criterion (selection criterion) and deciding a channel (WUR Discovery Channel) to wait for the WUR Discovery frame from 1ch in the 2.4-GHz band and 40ch, 44ch, 149ch, and 153ch in the 5-GHz band. In this embodiment, the STA 110 performs the processing based on the roaming policy (that is, the selection criterion) decided in F614 and information (values) included in the roaming management table (FIG. 7). This processing can be performed by the reception processing determination unit 217 and the selection unit 215.

First, in step S801, it is determined whether the arrangement of the communication unit 206, the WUR unit 208, and the antenna 209 of the STA 110 supports (corresponds to) the 5-GHz band. If the arrangement does not support the 5-GHz band, in step S802, the STA 110 selects 1ch as the WUR Discovery Channel. Note that an STA (terminal) of the IEEE802.11 standard is assumed to support the 2.4-GHz band.

In step S803, the subsequent processing branches depending on the selection criterion. The first selection criterion is a criterion for selecting a Channel having the minimum value of the WUR Discovery Period 707 (step S804). For example, in FIG. 7, the Channel having the minimum value of the WUR Discovery Period 707 is 153ch. Hence, the STA 110 selects 153ch as the WUR Discovery Channel. In this determination, a channel whose WUR Discovery Period 707 corresponds to "00 00" cannot be subjected to minimum value comparison and is therefore excluded from the selection target.

Steps S805 and S806 correspond to the second selection criterion, which is a criterion for selecting a Channel for which the average value of the WUR Discovery Period 707 is smallest. First, the STA 110 calculates the average value for each Channel in the management table shown in FIG. 7. The average values are "00 20" for 1ch, "00 04" for 40ch, and "00 60" for 44ch, 149ch is excluded from the target, and the average value for 153ch is "00 05". Here, each channel whose WUR Discovery Period 707 has "00 00" cannot be subjected to minimum value comparison and is therefore excluded from the average value calculation selection target. In step S806, the STA 110 selects the minimum value in the calculated average values. Hence, the STA 110 selects 40ch as the WUR Discovery Channel.

Steps S807 and S808 correspond to the third selection criterion, which is a criterion for selecting a Channel for which the maximum value of the WUR Discovery Period 707 is smallest. First, the STA 110 selects the maximum value for each Channel in the management table shown in FIG. 7. In step S808, the STA 110 selects the minimum value of the selected maximum value. If the Channel whose WUR Discovery Period 707 is "00 00" is excluded from the selection target, the STA 110 selects 40ch as the WUR Discovery Channel.

Steps S809 and S810 correspond to the fourth selection criterion, which is a criterion for selecting a Channel for which the number of WUR APs is largest. Here, the number of indices of the information of each Channel is counted on the management table (the number of Indices of the same Channel is counted). In step S810, a Channel for which the counted number is maximum is selected. Hence, the STA 110 selects, as the WUR Discovery Channel, 153ch for which four pieces of AP information exist on the table.

In the example, when roaming to another AP, a Channel whose index 701 is 7 is not the target of the selection criterion. An AP excluded from the selection target is the AP whose Transmitting WUR AP 702 is "1". This is because the value "1" represents that the AP is the AP connected when it is decided to perform roaming.

Figure 9:
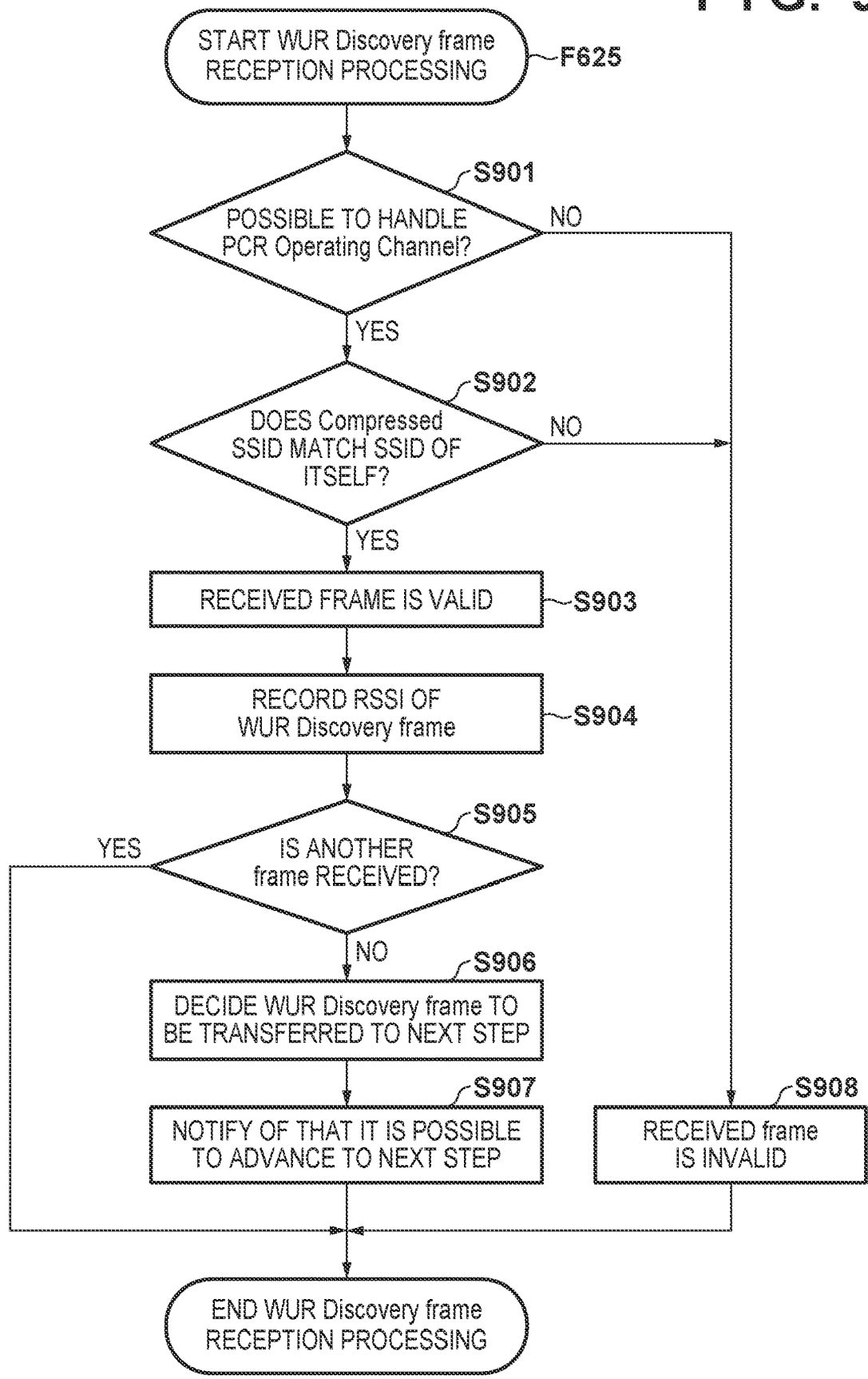
FIG. 9 is a flowchart showing reception processing of a WUR Discovery frame.

WUR Discovery frame reception processing in F625 of FIG. 6C will be described next with reference to FIG. 9. FIG. 9 is a flowchart showing WUR Discovery frame reception processing. This processing can be performed by the reception processing determination unit 217. This processing is determining whether to wait for another WUR Discovery frame when the STA 110 has received one WUR Discovery frame. At this time, if the STA 110 determines not to wait for another frame, the process advances to Beacon frame wait processing from F626 in FIG. 6C.

In step S901, the STA 110 determines whether it corresponds to the PCR Operating Channel (here, the 5-GHz band) 5-GHz band. For example, if the PCR Operating Channel of the WUR Discovery frame received by the STA 110 represents the 5-GHz band, the PCR of the STA 110 itself does not correspond to the 5-GHz band, the process advances to step S908. Otherwise, the process advances to step S902.

In step S902, the STA 110 determines whether the value of the Compressed SSID matches a desired value. This is determining whether the Compressed SSID 521 in the WUR Discovery frame received by the STA 110 matches the Short-SSID 705 in the management table or the 16-bit value of the LSB of the Short-SSID of the STA 110 itself. If the values match, the process advances to step S903. If the values do not match, the process advances to step S908. In step S908, the STA 110 regards the received WUR Discovery frame as invalid data and ends the reception processing.

In step S903, the STA 110 records that the received WUR Discovery frame as "valid". This is setting the "ID" of the received WUR Discovery frame in the WUR ID 704 of the management table and setting "valid" in the corresponding valid/invalid 714. In step S904, the STA 110 sets the value of the RSSI upon receiving the WUR Discovery frame in the PCR RSSI 713 in a similar manner.

In step S905, the STA 110 determines whether to receive another frame. To receive another frame, the process advances to the end of the reception processing. If another frame is not to be received, in step S906, the STA 110 decides the WUR Discovery frame to be transferred to the next step. This decision leads to performing subsequent processing in the operating channel of PCR represented by the decided WUR Discovery frame. More specifically, if there exists one data whose valid/invalid 714 at this point of time is "valid", the STA 110 transfers the WUR Discovery frame corresponding to "valid" to the next step. If a plurality of "valid" frames are received, the STA 110 selects one of them. This selection can be done by, for example, selecting a frame corresponding to the WUR RSSI 712 with the largest value. Next, in step S907, the control unit 202 is notified that it is possible to advance to the next step. This notification is executed as the result of the process of F625.

A case in which another frame is received in step S905 will be described here. This corresponds to a case in which WUR Discovery frames are received in one WUR Discovery Channel or all Channels as long as possible. Here, "as long as possible" includes attempting to comprehensively receive WUR Discovery frames for each Channel using the management table.

If the shift enable event to the next step is issued in this way after the end of the reception processing of F625, the STA 110 waits in the operating channel of PCR in accordance with the contents of the transferred WUR Discovery frame. Note that at this time, if the PCR unit 207 is in the power saving state, the STA 110 returns it to the normal state. Note that if the shift enable event to the next step is not issued after the end of the reception processing of F625, the STA 110 may attempt to receive a WUR Discovery frame using another WUR Discovery Channel.

Beacon frame reception processing of F627 will be described next. This processing can be performed by the reception processing determination unit 217. In this processing, when the STA 110 receives one Beacon frame, it is determined whether to wait for another Beacon. At this time, upon determining not to wait for another Beacon, the process advances to the processing state of F628 or F630.

A case in which it is determined "not to wait for another Beacon" is a case in which the BSSID that is the transmission source address of the Beacon received in F626 is included in the management table. Another determination condition is "the SSID in the Beacon received in F626 matches the SSID of the STA 110 itself" or "when converted into the Compressed SSID form or short-SSID form, the SSIDs match". Here, the SSID of the STA 110 itself is decided in F611.

As described above, according to this embodiment, a roaming method suitable for the operation state of the AP on the periphery is decided, thereby improving power saving performance, connection responsiveness, and usability. In addition, the time until WUR Discovery frame reception can be shortened.

<Modification 1>

In the procedure of steps S803, S809, and S810 in FIG. 8, the STA 110 may use the number of indices in which the value of the short-SSID exists, or the number of indices that match the short-SSID of the STA 110 in place of the number of WUR APs. This can improve the probability of receiving a valid WUR Discovery frame.

<Modification 2>

In the procedure of steps S803, S809, and S810 in FIG. 8, the number of indices in which the value of the BSSID exists may be used in place of the number of WUR APs. This can shorten the time until the operating channel of an AP for which an appropriate roaming destination exists is selected.

<Modification 3>

In the above-described embodiment, a channel whose WUR Discovery Period 707 corresponds to "00 00" is excluded from the selection target. However, this may be included in the selection target. In the above embodiment, the channel is excluded from the selection target because its value is unknown. In this modification, the channel is also included in the selection target and processed. This can improve the probability of receiving the WUR Discovery frame without wasting the information acquired concerning roaming.

<Modification 4>

A limit value may be provided for the processing time in F625 or F627 of FIG. 6C. This copes with a case in which a long time is needed to receive the WUR Discovery frame or a case in which even if the WUR Discovery frame can be received, an AP appropriate as the roaming destination does not exist. In this case, instead of roaming using the information of the WUR Discovery frame, processing of waiting for the Beacon in all channels of PCR is performed. The WUR Discovery frame wait time based on short information is thus limited, thereby preventing power from being wasted.

<Modification 5>

After F630 or F631 in FIG. 6C, the procedure of F626 and F627 may be performed when the communication state degrades. At this time, the process may advance to F628 in accordance with reception of a Beacon from an AP with a large PCR RSSI 713. This can perform satisfactory PCR communication.

<Modification 6>

If the WUR Discovery element cannot be acquired in F607 of FIG. 6A or F613 of FIG. 6B, the process of F623 of FIG. 6C may be changed to processing of "waiting for a frame in all WUR Discovery Channels".

<Modification 7>

If the WUR Discovery element cannot be acquired in F607 of FIG. 6A or F613 of FIG. 6B, after F622 of FIG. 6C, the PCR may be set in an awake state to wait for a frame in all channels of PCR.

<Modification 8>

In FIG. 6C, even after F630 is executed once, the STA 110 may record the RSSI in PCR and perform roaming to another access point with a satisfactory RSSI value.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-043048, filed Mar. 8, 2019, which is hereby incorporated by reference herein in its entirety.

What is claimed is:

1. A communication apparatus comprising:
    one or more memories having instructions stored therein; and
    one or more processors that, upon execution of the instructions, are configured to:
        receive a radio frame complying with an IEEE802.11 series standard;
        acquire information of a WUR (Wake-up Radio) Discovery element included in the received frame; and
        decide, by selecting a WUR channel among more than one WUR channels indicated by the acquired information of the WUR Discovery element, a WUR channel to be used to wait for a WUR Discovery frame, the selection being based on a WUR channel to be used by the largest number of other communication apparatuses.

2. The apparatus according to claim 1, wherein the one or more processors are further configured, upon execution of the instructions, to determine, based on information included in the WUR Discovery frame received in the WUR channel, whether reception of the WUR Discovery frame is valid.

3. The apparatus according to claim 2, wherein if the information included in the WUR Discovery frame received in the WUR channel represents an operating channel of PCR of 5 GHz, and the communication apparatus supports a 5-GHz band, it is determined that the reception of the WUR Discovery frame is valid.

4. The apparatus according to claim 2, wherein if the information included in the WUR Discovery frame received in the WUR channel represents a Compressed SSID, and the Compressed SSID matches an SSID of the communication apparatus, it is determined that the reception of the WUR Discovery frame is valid.

5. A control method of a communication apparatus, comprising:
   receiving a radio frame complying with an IEEE802.11 series standard;
   acquiring information of a WUR (Wake-up Radio) Discovery element included in the received frame; and
   deciding, by selecting a WUR channel among more than one WUR channels indicated by the acquired information of the WUR Discovery element, a WUR channel to be used to wait for a WUR Discovery frame, the selection being based on a WUR channel to be used by the largest number of other communication apparatuses.

6. A non-transitory computer-readable storage medium storing a computer program for causing a computer to execute a control method of a communication apparatus, the method comprising:
   receiving a radio frame complying with an IEEE802.11 series standard;
   acquiring information of a WUR (Wake-up Radio) Discovery element included in the received frame; and
   deciding, by selecting a WUR channel among more than one WUR channels indicated by the acquired information of the WUR Discovery element, a WUR channel to be used to wait for a WUR Discovery frame, the selection being based on a WUR channel to be used by the largest number of other communication apparatuses.

7. A communication apparatus comprising:
   one or more memories having instructions stored therein; and
   one or more processors that, upon execution of the instructions, are configured to:
      receive a radio frame complying with an IEEE802.11 series standard;
      acquire information of a WUR (Wake-up Radio) Discovery element included in the received frame; and
      decide, by selecting a WUR channel among more than one WUR channels indicated by the acquired information of the WUR Discovery element, a WUR channel to be used to wait for a WUR Discovery frame, the selection being based on an interval to transmit the WUR Discovery frame.

8. The apparatus according to claim 7, wherein a WUR channel for which the interval to transmit the WUR Discovery frame is minimum is selected in the selection.

9. The apparatus according to claim 7, wherein a WUR channel for which an average value of the interval to transmit the WUR Discovery frame is minimum is selected in the selection.

10. The apparatus according to claim 7, wherein a WUR channel for which a maximum value of the interval to transmit the WUR Discovery frame is minimum is selected in the selection.

11. A control method of a communication apparatus, comprising:
   receiving a radio frame complying with an IEEE802.11 series standard;
   acquiring information of a WUR (Wake-up Radio) Discovery element included in the received frame; and
   deciding, by selecting a WUR channel among more than one WUR channels indicated by the acquired information of the WUR Discovery element, a WUR channel to be used to wait for a WUR Discovery frame, the selection being based on an interval to transmit the WUR Discovery frame.

12. A non-transitory computer-readable storage medium storing a computer program for causing a computer to execute a control method of a communication apparatus, the method comprising:
   receiving a radio frame complying with an IEEE802.11 series standard;
   acquiring information of a WUR (Wake-up Radio) Discovery element included in the received frame; and
   deciding, by selecting a WUR channel among more than one WUR channels indicated by the acquired information of the WUR Discovery element, a WUR channel to be used to wait for a WUR Discovery frame, the selection being based on an interval to transmit the WUR Discovery frame.

* * * * *